Figure 2:
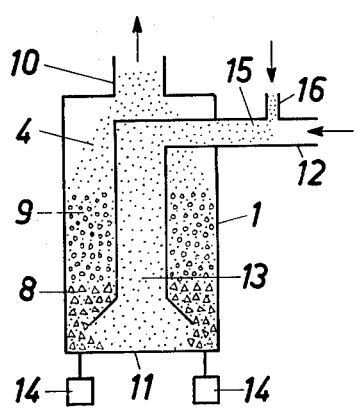

July 19, 1966  B. S. JAVORSKY ET AL  3,261,661

TREATMENT OF MATERIAL IN A BED OF INERT PARTICLES

Filed March 13, 1962

BRONISLAV STEFAN JAVORSKY
and
AKE LENNART ANDERSSON
INVENTORS.

BY *(signature)*

ATTORNEY.

though a bed of non-combustible particles, so as to fluidize said bed to cause intimate mixing of combustible particles and air in said stream during the final combustion.

United States Patent Office 3,261,661
Patented July 19, 1966

3,261,661
TREATMENT OF MATERIAL IN A BED OF INERT PARTICLES
Bronislav Stefan Javorsky, Lidingo, and Åke Lennart Andersson, Stockholm, Sweden, assignors to Aktiebolaget Celleco, Stockholm, Sweden, a corporation of Sweden
Filed Mar. 13, 1962, Ser. No. 179,450
Claims priority, application Sweden, Mar. 15, 1961, 2,739/61
1 Claim. (Cl. 23—1)

The present invention relates to treatment of gas and/or solid or fluid finely divided material contained in the gas in a bed of inert particles, resistant to said treatment, said bed being fluidized by a stream of said gas.

The treatment proper may be of one or other of various kinds as for instance combustion, pyrolysis, drying, or heat-exchange.

As an example of a process in which such a treatment occurs as a combustion process may be mentioned the final combustion stage of a combustion combination, which is very efficient per se, consisting of a first combustion stage, in which a substance, suspended in a stream of combustion air is burnt incompletely with part of that air, and a second combustion stage, in which final combustion of said substance occurs in the rest of the air, while the stream is passed through a bed of non-combustible particles, so as to fluidize said bed to cause intimate mixing of combustible particles and air in said stream during the final combustion.

The advantages of the intense or intimate mixing action of the fluidized bed on the media taking part in the treatment are well-known in many connections. Thus as a result thereof, the final combustion in the process referred to above may be carried out with a minimum of surplus air, which, for instance by combustion of $SO_2$ according to that process has been used to receive unusually high contents of $SO_2$ in the flue gases. Generally it may be said that, in accordance with the invention, the need for a surplus of the one or the other of the media, as well as the necessary reaction time to carry out the treatment may be considerably decreased. It is a necessary condition if such results are to be obtained, however, that the fluidization shall be caused to pass undisturbed and with highest efficiency at all times. However, the means and methods hitherto available to produce fluidization have not been reliable, in many cases fluidization being so unreliable as markedly to reduce the potential advantages and the usefulness of this method.

Thus it has up to now been common practice to supply the fluidizing stream of gas to the bed through a stationary distributor for the gas which, as for instance in the shape of a grate or perforated bottom, forms the lower boundary of the bed.

However, this method causes the following considerable disadvantages. The distributor must have very narrow passages which are liable to clogging and cannot be cleared without interruption of the treating process. Partial clogging causes unevenly distributed fluidizing and treatment effect in the bed. Therefore one must calculate with relatively low load factors which results in considerably larger and more expensive apparatus than would be necessary with even distribution, and/or must use expensive methods for aftertreatment. This is true especially for units of apparatus for high capacity, where the distribution problem becomes more difficult to cope with because of the larger dimensions of such apparatus.

The described clogging may be caused by the bed particles alone. In addition, if the material or a medium to be treated is for instance a very finely divided material, liquid or gas, such material if supplied to the bed above the distributor would quickly be blown out of the bed without being sufficiently dispersed or without getting sufficient reaction time in the bed for the treatment intended. In many cases it is possible to eliminate said disadvantages by supplying such material to the bed through the distributor previously dispersed in the fluidizing stream of gas. In that case, however, it is clear that the clogging tendency may be considerably increased and this effect may also be caused by contaminations entrained in that stream of gas. Thus, the elimination of such a clogging is, as a rule, an object to be highly desired.

It is the object of the invention to render such an elimination possible by distributing the fluidizing stream of gas to the fluidized bed through another bed (distribution bed) of other inert particles which have so much higher falling velocity in the gas than the particles of the fluidized bed that it is possible under the influence of said stream to cause said other inert particles to move without any essential part of said distribution bed reaching a fluidized state. The velocity of said stream is regulated so as to obtain that effect.

The invention will now be described more particularly with reference to the accompanying drawing which schematically and as examples illustrates side sections of two modifications in FIG. 1 and FIG. 2 respectively, of apparatus for carrying out the invention. Identical details are in the different figures indicated by the same reference numerals.

According to FIG. 1 a combustion chamber 1 is divided by a horizontal grid 2 into a first combustion space 3 below the grid and a second combustion space 4 above the grid. Into the first combustion space a combustible material, for instance sulphur in melted fluid state, is introduced, through an atomizing burner 5 with a control valve 6. Air is supplied, in a quantity sufficient for the combustion of the supplied sulphur to $SO_2$, through a tangential inlet 7 from a blower or the like, not shown in FIG. 1. Thereby the sulphur in the first combustion space is partially burned in part of said air. The stream of the resulting flue gases, which pass from space 3 through the grid 2 into the second combustion space 4, will thus contain partially burned sulphur, as well as unburned sulphur in gasified state and air for complete combustion of the sulphur. In this space said stream is distributed, on its way through a distribution bed 8 of incombustible particles, as fluidizing gas to a fluidized bed 9, also of incombustible particles in which the final combustion takes place. The final flue gases escape through an outlet 10.

Particles contained in a stream of gas in a duct in this way get into a state of motion the character of which varies with the ratio between the gas velocity $Wg$ (counted on the total cross section area of the duct) and the falling velocity $Ws$ of the particles in the gas in question according to the following table.

State of motion: $Wg/Ws$, C.
(a) Motionless _____ 0–0.015
(b) Motion starts without fluidization __ 0.015–0.06
(c) Complete fluidization _____ 0.06–0.5
(d) Intense fluidization difficult to control _____ 0.5–1
(e) The particles become entrained in the stream of gas, over 1.

A layer of particles even of small depth gives a good distribution effect in the motionless state *a* as well as in the state of motion *b*. By passing over to the other states deeper and deeper layers are required to cause such effect.

As a first alternative it may be assumed that the particles of the distribution bed are dimensioned in relation to the particles of the fluidized bed so that the falling velocity of the first-mentioned particles is so much higher than that of the latter particles that when the motion state of the latter particles is *c*, the motion state of at least most of the first-mentioned particles is *b*. As the latter particles in normal operation are fluidized, the former particles will thus make up a moving but not fluidized distribution bed, within which the particles move in relation to each other in such a way as to make difficult, or completely prevent, the formation of clogs in the bed. The tendency to form clogs occasionally is accompanied by the formation of craters in other parts of the bed. This may be remedied by momentarily increasing the gas velocity so as to increase the motion of the particles (occasional gas shocks).

According to another alternative, particles of the distribution bed may be dimensioned so as during normal operation to form a motionless distribution bed, which by means of occasional gas shocks is caused to move into stage *b*.

As a third alternative it is also possible to divide the distribution bed into an upper and lower part layer with different particles sizes so that in normal operation the upper layer is put into motion state *b* while the lower layer remains motionless.

Thus, the formation of clogs is prevented, during continuous operation, such method additionally making it possible to use according to the first alternative, powerful cleaning steps in the form of occasional gas shocks. The second alternative makes discontinuous cleaning possible, such cleaning being carried out without interruption of the operation.

In both cases the grid only serves to carry a material, which in relation to the fluidized particles consists of very coarse particles and may therefore, in most cases, be provided with such wide passages that it has no tendency to clog.

In this connection the grid may constitute a first coarse distributor for the fluidizing gas possibly in cooperation with the motionless layer according to the third alternative. Thus, this layer may be made up of particles of such sizes, that it may be cleaned by occasional gas shocks.

Such gas shocks may be generated by abrupt variations in the air supply. It has however surprisingly been ascertained that they also may be generated by temporarily cutting off and restoring the injection of fuel by means of valve 6 in rapid succession whereby ignition shocks, which propagate in the fluidizing stream of gas, will appear in the first combustion chamber.

FIG. 2 illustrates a modified device wherein the need of a support such as the grid 2 for the distribution bed is eliminated. The distribution bed 8 is here supported by the bottom 11 of the combustion space 4 and the fluidizing stream of gas is supplied to that bed at bottom 16 for instance from a first combustion space according to FIG. 1, or from some other source as shown via a pipe line 12 and a central duct 13, which flares outwardly at a relatively small height above said bottom and forms a support in an annular part of the combustion space for the distribution bed 8 and the fluidized bed 9.

Figure 1:
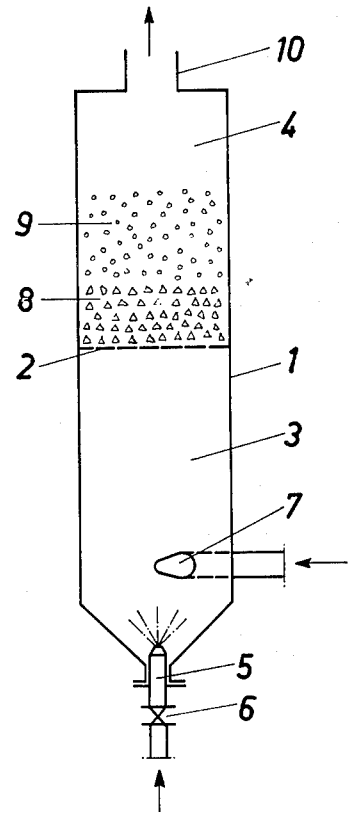

It is clear that the fluidization in the device according to FIG. 2 may be operated in exactly the same alternative way as the fluidization in the device according to FIG. 1 with the same possibilities of choice of the size of particles in the distribution bed and the same possibilities of causing motions in the same under the influence of the fluidizing gas. In addition, this device is also suited to an alternative method to cause said motions, that is to say by means of mechanical vibration. For that reason vibrators 14 are provided to work against the bottom 11, such vibrations transmitting vibrations therefrom to the distribution bed. The vibrators may also be used continuously or intermittently to strengthen the movements caused by the fluidizing gas, or completely to substitute the gas as a motion inducer for the distribution bed. In both cases the vibrators render it possible to use larger particles in the distribution bed than those to which the required motion may be imparted by influence of the fluidizing gas alone.

It is clear that the invention, by making possible the maintaining of an evenly distributed supply of fluidizing gas under the fluidized bed, involves the possibility of maintaining combustion conditions in all parts of said bed which are so close to ideal combustion conditions that, contrary to previous practice, it will not be necessary considerably to overdimension the furnace to compensate for disturbances, if any.

In a device according to FIG. 2 the whole combustion process may also be performed in one stage in the fluidized bed, whereby the combustion air is supplied directly through the inlet 12 entraining the combustible material, which here is shown as a granular solid material 15, supplied through an inlet 16, but which also may be solid or fluid finely divided material or gas, mixed with the combustion gases in some other way. Also in a device in principle according to FIG. 1 the combustion may be operated in this way by allowing it to occur exclusively in the space 4 while the space 3, preferably greatly shortened, is utilized only as a mixing chamber for air and combustible material under the grid 2.

The described effects of the invention on the fluidized bed are, of course, not limited to the case wherein combustion of combustible material takes place in air. Such process is referred to as an important example only. A multiplicity of other contact processes between media contained in the fluidizing stream may also be carried out in accordance with the invention, as for instance pyrolysis, heat exchange, drying, absorption and the like. Media employed in such latter processes may be included in and constitute said stream in the same way as the combustion air and the combustible material in the cases specifically described above. Materials included in the stream in a state suitable for fluidization may possibly form part of or constitute the entire fluidized bed. Such material may possibly also be suplied to the fluidizing stream in the distribution bed or in the fluidized bed proper.

What we claim is:

In the process of treating gas containing finely divided particles in a fluidized bed of solid inert other particles resistant to the intended treatment, a stream of said gas entraining said finely divided particles being passed upwards through an essentially vertical duct in succession through the interspaces between the particles of a first bed of relatively coarse inert first particles and thereafter through a second bed of relatively fine inert second particles, at a gas-velocity at which said second bed in which the treatment takes place is maintained in a fluidized state under the influence of said stream of gas, the improved method which comprises in combination the steps of providing a first bed of such inert first particles, such first particles being so dimensioned in relation to said inert second particles that the range of gas-velocities at which, by the influence of said stream of gas, said second bed is maintained in a fluidized state, will include predetermined gas velocities at which, by influence of the same stream of gas, said first bed will be stirred without any essential part thereof reaching a fluidized state, and regulating at least temporarily the velocity of said stream of gas through said first and second bed so as to correspond to such predetermined gas-velocities, thereby causing such stirring of said first bed, while retaining the fluidized state of the second bed.

(References on following page)

References Cited by the Examiner

UNITED STATES PATENTS

| | | |
|---|---|---|
| 1,776,876 | 9/1930 | Winkler. |
| 2,835,483 | 5/1958 | Lindsay. |
| 2,948,587 | 8/1960 | Johnson et al. |
| 2,960,388 | 11/1960 | Johnson et al. |

FOREIGN PATENTS 838,208   6/1960   Great Britain.

TOBIAS E. LEVOW, *Primary Examiner.*

PERCY L. PATRICK, *Examiner.*

J. HALSEY, S. E. MOTT, *Assistant Examiners.*